3,168,368
METHOD OF TREATING EXHAUST GASES OF
INTERNAL COMBUSTION ENGINES
George Alexander Mills, Swarthmore, Pa., assignor to
Air Products and Chemicals, Inc., a corporation of
Delaware
No Drawing. Filed Apr. 27, 1960, Ser. No. 24,896
1 Claim. (Cl. 23—2)

This invention relates to catalytic oxidation of the exhaust gas from an internal combustion motor, and particularly to prolonging the catalyst life.

When an internal combustion motor is operated in appropriate location, such as in a rural or desert area, the exhaust gases can be vented to the atmosphere without serious problems. In other locations, however, as in large metropolitan areas or underground mines, where the content of hydrocarbons (especially the heavier hydrocarbons containing less hydrogen than $C_nH_{2n+2}$ in which $n$ is greater than 4) and/or carbon monoxide in the gases exhausted to the atmosphere can desirably be reduced, the use of a catalyst chamber may be desirable or necessary. Under substantially all operating conditions, the gases withdrawn from an internal combustion motor contain measurable amounts of oxygen, so that it is feasible to subject such gases directly to catalytic oxidation even though it often is desirable to introduce additional air for the catalytic oxidation step. Similarly, the problems related to temperature control within the catalyst zone can be handled either in the conventional manner or by any of the various alternatives, inasmuch as the present invention is particularly concerned with the combination of a fuel supply of controlled composition and a catalytic zone having stabilized activity by reason of the incremental deposition of catalytically active particles. Some public health authorities believe that in order to prevent smog in metropolitan areas, most autos should be equipped with effective catalytic units for burning exhaust gases. Some of the previously proposed catalytic units for autos have become significantly deactivated after use of a period corresponding to only a few hundred miles of typical driving. There is reason to believe that more governmental agencies will require autos to be equipped with catalytic mufflers after average motorists use the catalysts satisfactorily for at least 10,000 miles. An expected life of about 40,000 miles of normal driving would have special advantages. A catalyst which could be guaranteed for the life of the automobile is the ultimate goal. Thus prolonging the life of a catalytic muffler while keeping the installation cost satisfactorily low has been one of the problems delaying widespread adoption of catalytic mufflers during the many years since the proof that exhaust gases could be burned catalytically.

Various components of the exhaust gases, including oxides of nitrogen, water vapor, lead bromide, etc., may contribute to the deactivation of the catalyst. For example, lead compounds may be deposited on the active sites in the catalyst to poison the catalyst. Although platinum is a powerful catalyst for oxidizing hydrocarbons, the difficulties of minimizing such lead poisoning of platinum have resulted in little use of platinum in catalytic mufflers for automobiles.

In accordance with the present invention, prolonged useful life for a catalytic muffler for an automobile is achieved by employing particles of porous (that is, having a high surface area such as greater than 1 m.²/g.) refractory catalyst carrier providing a greater volume than the displacement of the internal combustion motor. These catalyst carrier particles contain an oxide of at least one metal having an atomic number at least 5 greater than the lower rare gas and at least 7 less than the higher rare gas (that is, atomic numbers 23–29, 41–47 and 59–79), which metal oxides on such porous refractory oxide catalyze the oxidation of heavy hydrocarbons. A fuel containing a small amount of compound of said selected metal (or metals) is employed in the internal combustion engine so that said metal compound burns in the internal combustion motor to form metal oxide, so that metal oxide is present in the exhaust gas, and so that additional amounts of the oxide of said selected metal are deposited in catalytically active form in the large volume of porous refractory support throughout the life of the catalytic muffler.

The invention also comprises the combination of the internal combustion motor, the fuel supply consisting of said gasoline containing about 0.03% to about 0.08% of the metal, a volume of porous refractory granules greater than the cubic displacement of the motor and tubes directing the exhaust gases through such catalyst granules.

An important feature of the present invention is the emphasis upon the combustion of the heavier hydrocarbons without regard to the content of methane, carbon monoxide and related components in the exhaust gas. Thus the present invention seeks to minimize smog under typical operating conditions and is not expected to eliminate all traces of carbon monoxide from the exhaust gas under all possible operating conditions.

In the development of the present invention, it was discovered that many metal oxides, when formed by combustion of a metal-containing fuel and deposited throughout a large volume of porous refractory, catalyze the oxidation of heavier hydrocarbons sufficiently to reduce the content of such heavier hydrocarbons at least 50% under a considerable variety of circumstances. Smog difficulties arise when the gasoline consumption per square mile exceeds high limits, so that universal use of a catalytic muffler having 90% efficiency permits the automobile density to increase about tenfold before recurrence of smog problems, and an efficiency of 50% in reducing the concentration of heavier hydrocarbons permits a doubling of auto density prior to recurrence of smog problems. Accordingly, an approach toward catalytic mufflers for smog prevention was appropriate which might have been unsafe in developing mufflers suitable for use inside a warehouse or other poorly ventilated building. Much of the failure of prior art workers has arisen from previous attempts to employ warehouse type catalytic mufflers for smog prevention.

The invention is further clarified by reference to a plurality of illustrative examples.

*Example I*

A catalytic muffler contains approximately 35 pounds of catalyst beads consisting predominantly of porous alumina containing about 12% oxide of manganese. The gasoline employed in the internal combustion motor contains 0.5% manganese in the form of methylcyclopentadienyl manganese tricarbonyl having the formula $CH_3C_5H_4Mn(CO)_3$ so that the exhaust gas from such motor contains finely divided oxide of manganese, which deposits on the hot manganese oxide-alumina catalyst beads and securely bonds itself to the catalyst. After prolonged operation of the motor, the catalytic surface exposed to the exhaust gas consists predominantly of the manganese oxide derived from the combustion of the fuel. The weight ratio of thus deposited manganese oxide to initial manganese oxide does not exceed 2 to 1 until after burning about 2,300 gallons of such fuel, indicative of approximately 46,000 automobile miles. The hydrocarbon fuel, in addition to the $CH_3C_5H_4Mn(CO)_3$ catalyst accelerator, contains the conventional mixture characterized by tetraethyl lead, so that compounds of lead are also codeposited in the catalyst. Because the manganese oxide is deposited in the catalyst simultaneously, the lead compound deposit does not prevent the catalyst from being sufficiently active to promote the oxidation of heavier hydrocarbons in the exhaust gas. As previously mentioned, the prevention of smog is dependent primarily upon minimizing discharge of heavier hydrocarbons into the atmosphere.

*Example II*

Spherical beads of porous sorptive alumina are impregnated with ammonium molybdate and calcined to provide 3% molybdena in the catalyst. The exhaust gas from an internal combustion motor is passed through a catalytic muffler containing such molybdena on alumina catalyst, thereby burning the heavier hydrocarbon components and decreasing the $C_5+$ hydrocarbon content in the exhaust gas from about 2,800 parts per million to about 800 parts per million, or about 71%. This efficient purification of the exhaust gas continues during a long period, partly because the fuel contains 0.08% molybdenum compound chelated as the ethylene diamine tetraacetate. The concentration of lead in a typical motor fuel (2 cc. per gallon) is about 0.038% so that the oxidation promoter is present in the fuel in a concentration greater than the concentration of lead.

During the combustion of the fuel the lead content is converted to compounds such as lead bromide and the molybdenum compound is converted to molybdenum oxide. The metallic products from the combustion are deposited on the surface of the molybdena-alumina catalyst, and provide a fresh molybdena surface catalytically active in the combustion of the $C_5+$ hydrocarbon components in the exhaust gas. Moreover, a portion of the carbon monoxide is converted to carbon dioxide by the catalytic combustion over the molybdena-alumina catalyst. Thus the use of the catalyst helps to reduce the concentration of large hydrocarbon molecules in the exhaust gas from the catalytic muffler, and thereby helps to reduce the possibility of smog in the metropolitan area in which the internal combustion motor is operated.

*Example III*

Cylindrical pellets of kaolin cracking catalyst are impregnated with cobalt formate and calcined to provide a supported cobalt type of oxidation catalyst. The catalyst pellets are employed in a catalytic muffler in which there is burned a mixture of supplemental air and the exhaust gas from an internal combustion motor. The fuel employed in the internal combustion motor is a highly aromatic gasoline containing about 1 cc. per gallon of a mixture of tetraethyl lead, ethylene bromide, ethylene chloride and dye, generally designated as anti-knock fluid. In alternative embodiments, the halide compounds are omitted from the anti-knock fluid, and the lead oxide is withdrawn from the motor by entrainment in the exhaust gas. The fuel also contains 0.03% of cobalt chelated with acetylacetone. The catalytic muffler has satisfactory stability and promotes the combustion of the heavy hydrocarbons throughout a long useful life. The cobalt oxide thus deposited on the catalyst is effective in promoting the desired oxidation of the larger hydrocarbon components in the oxide gas.

*Example IV*

Catalyst granules consisting predominantly of sorptive alumina and containing about 5% cobalt molybdate are employed in a catalytic muffler associated with an internal combustion motor operating on a fuel containing minor amounts of compounds of lead, molybdenum and cobalt. The cobalt may be present as a mixture of cobalt carbonyl and cyclopentadienylcobalt carbonyl. Oxides of cobalt and molybdenum are codeposited on the catalyst together with compounds of lead and the oxides of cobalt and molybdenum thus deposited on the catalyst are effective in promoting oxidation of heavy hydrocarbon components during additinoal operation of the internal combustion motor. The concentration of the cobalt and molybdenum compounds msut be controlled so that the total is within the range from 0.03% to 0.08% of the weight of the fuel and so that such metal content is greater than the concentration of the lead in such fuel.

*Example V*

Vanadia-silica catalyst particles are prepared by impregnating an aqueous solution of the vanadium compound into porous silica and calcining the impregnate. A motor fuel is prepared containing about 3 cc. of tetraethyl lead anti-knock fluid per gallon, corresponding to about 1.9 grams of lead per gallon of fuel or about 0.056% by weight and a larger quantity of vanadium compound maintained in the gasoline as the Versene chelate, that is, as the chelate of ethylene diamine tetraacetic acid.

*Example VI*

A catalytic muffler is prepared containing porous glass beads resistant to the attrition tendencies attributable to the vibration of a moving auto and having a surface area greater than about 1 m.²/g. The glass beads are impregnated to contain approximately 5% by weight of chromium oxide and the catalyst is utilized in conjunction with a fuel containing organic chromium compounds such as chromium acetate in amounts providing from 0.03 to 0.08% by weight chromium, being slightly more chromium in the fuel than the lead content thereof. In various modifications of this method, the fuel contains one or more metals having an atomic number at least 5 greater than the lower rare gas and at least 7 less than the higher rare gas. Said group of metals consists of atomic numbers 23–29, 41–47 and 59–79 and can be listed as V, Cr, Mn, Fe, Co, Ni, Cu, Cb, Mo, Te, Ru, Rh, Pd, Ag, Pr, Nd, Pm, Sm, Eu, Gd, Tb, Dy, Ho, Er, Tm, Yb, Lu, Hf, Ta, W, Re, Os, Ir, Pt and Au. The catalyst initially contains an oxide of one of such transition metals, so that both initially and throughout a long useful life the metal oxide in the catalytic muffler helps to bring about the combustion of a major amount of the heavier (that is, $C_5+$) hydrocarbons in the catalytic muffler.

Obviously many modifications and variations of the invention as hereinbefore set forth may be made without departing from the spirit and scope thereof, and therefore only such limitations should be imposed as are indicated in the appended claim.

The invention claimed is:

The method of operating an internal combustion motor to provide an exhaust gas containing a low concentration of higher molecular weight combustible components which method includes the steps of: operating the internal combustion motor with a liquid hydrocarbon fuel containing molybdenum in a concentration range from 0.03 to 0.08% by weight of the fuel and tetraethyl lead in a concentration providing less lead than molybdenum; withdrawing from the internal combustion motor an exhaust gas containing higher molecular weight combustible components, said exhaust gas also containing entrained and suspended particles of molybdenum oxide; admixing said exhaust gas with an amount of air less than the amount of exhaust gas and directing the thus prepared mixture through a bed of porous refractory granules having a volume greater than the cubic displacement of the internal combustion motor, said granules containing a minor amount of an oxide of molybdenum, whereby at least a portion of the higher molecular weight combustible components in the exhaust gas are burned and accelerating amounts of molybdenum oxide catalyst are deposited on said refractory granules to stabilize the effectiveness of the catalytic combustion of such higher molecular weight combustible components in the exhaust gas.

References Cited in the file of this patent

UNITED STATES PATENTS

| | | |
|---|---|---|
| 1,855,165 | Barker | Apr. 19, 1932 |
| 2,071,119 | Harger | Feb. 16, 1937 |
| 2,410,829 | Luten | Nov. 12, 1946 |
| 2,747,976 | Houdry | May 29, 1956 |
| 2,902,983 | Patberg | Sept. 8, 1959 |
| 2,909,415 | Houdry | Oct. 20, 1959 |
| 2,913,413 | Brown | Nov. 17, 1959 |
| 2,942,932 | Elliott | June 28, 1960 |
| 2,991,160 | Claussen | July 4, 1961 |
| 3,024,593 | Houdry | Mar. 13, 1962 |

UNITED STATES PATENT OFFICE
CERTIFICATE OF CORRECTION

Patent No. 3,168,368                 February 2, 1965

George Alexander Mills

It is hereby certified that error appears in the above numbered patent requiring correction and that the said Letters Patent should read as corrected below.

Column 2, line 57, for "0.5%" read -- 0.05% --; column 4, line 3, for "additinoal" read -- additional --; line 5, for "msut" read -- must --; same column 4, line 38, for "Te," read -- Tc, --.

Signed and sealed this 23rd day of November 1965.

(SEAL)
Attest:

ERNEST W. SWIDER                             EDWARD J. BRENNER
Attesting Officer                              Commissioner of Patents